Dec. 5, 1933.  E. G. GAGE  1,937,753
SYSTEM FOR SUPPLYING CURRENT TO VACUUM TUBES
Filed April 8, 1924  2 Sheets-Sheet 2

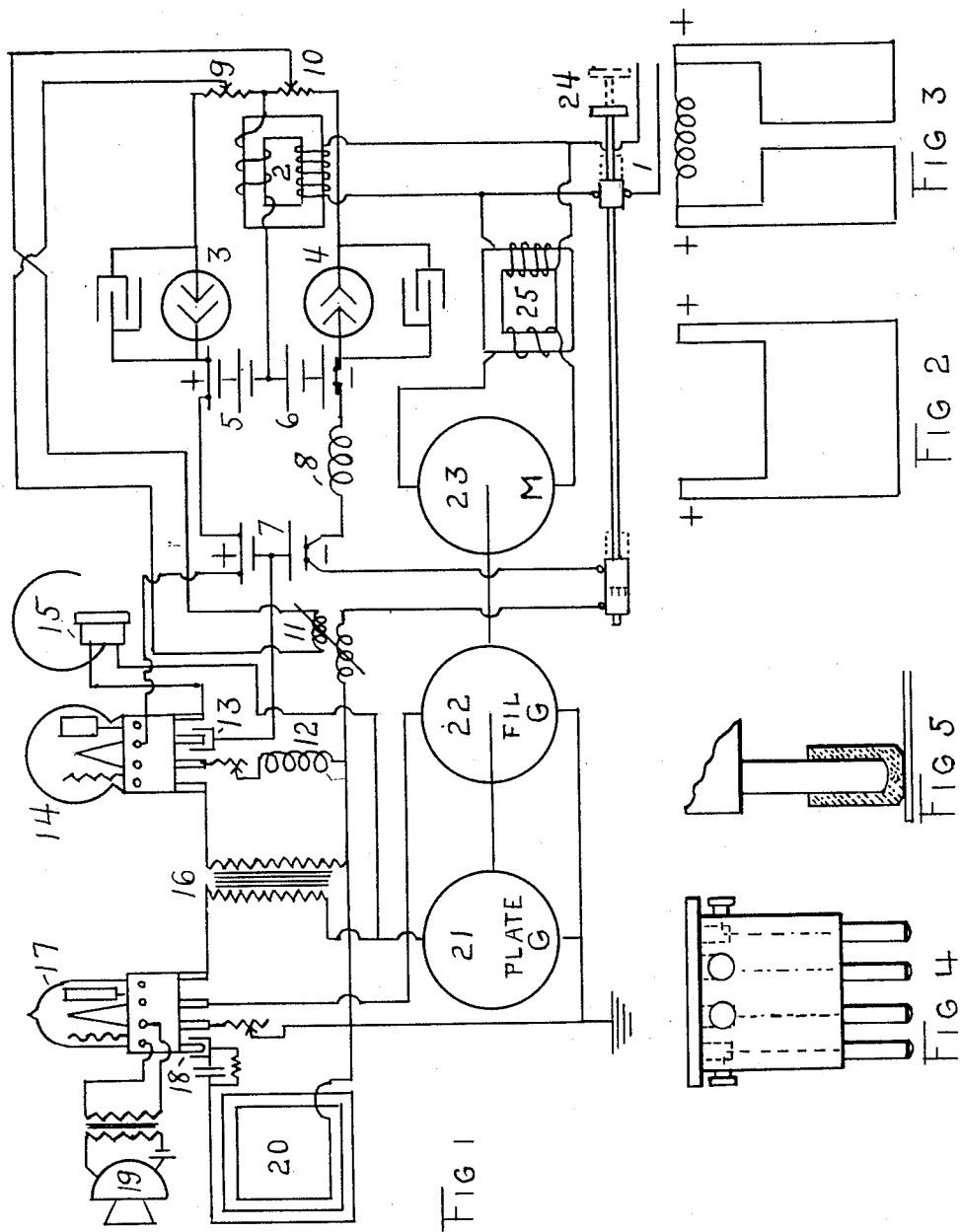

*Edward G. Gage* INVENTOR

Patented Dec. 5, 1933

1,937,753

UNITED STATES PATENT OFFICE 1,937,753

SYSTEM FOR SUPPLYING CURRENT TO VACUUM TUBES

Edward G. Gage, Brooklyn, N. Y., assignor to Radio Corporation of America, a corporation of Delaware Application April 8, 1924. Serial No. 704,966

13 Claims. (Cl. 250—27)

This application is a continuation in part of my prior application Serial Number 629,292, filed April 2nd, 1923.

My present invention relates to a system for supplying both the filament and plate circuits of vacuum tubes from an alternating current supply, such as is commonly found in residences, offices, etc., and distributing the units in such manner that the entire system may be assembled within a case as for example, within a phonograph cabinet.

An object of my invention is to provide refinements in the filament heating current supply to enable the most sensitive instruments such as radio apparatus with multi-stage amplifiers to receive from great distances without interference from the lighting circuit.

Another object of my invention is to provide a motor-generator set which will operate from the standard housewiring circuit, without commutator noise.

Another object is to provide a special socket adapter to allow any element of a vacuum tube to be connected independently to another circuit, so that it may be used in a different manner if desired.

Other and ancillary objects will hereinafter appear.

In the practical application of my invention current for the filament is obtained from an alternating current source, and is used to charge a battery of miniature storage cells through two rectifiers, each rectifier being so connected that it charges only half of the battery and operates during a period when the other rectifier is idle. This prevents adding of interfering pulses.

The total counter E. M. F. of this battery is then used to charge another miniature storage battery having a smaller number of cells than the first, consequently a lower counter E. M. F.

This second set of cells is shielded from the alternating current supply by an impedance, and the load is connected across the terminals of these cells, whose counter E. M. F. supplies the necessary current without fluctuation.

The plate circuit is supplied from a motor generator operated preferably from the same alternating current supply.

I am aware that the conventional motor generator set cannot be used for this purpose, owing to commutation noises, and to overcome this defect I have shown a special type of motor and generator for the purpose.

These machines have no audible commutator ripple, and may be used to supply either filament or plate by proper winding for the desired voltage. They may also be used in telegraphy or telephony or wherever a silent source of current is desired.

I accomplished this result by providing a commutator of resistant material, whose surface is without interruptions, and I provide a number of poles in the armature which, when running at normal speed produces a commutator ripple below the lower limit of audability, 16 per second as specified in my prior U. S. application dated March 23rd, 1923, Serial Number 627,002.

To prevent troughs and crests in the final wave formed, I provide two such armatures in two phase distribution, causing one armature to operate at maximum while the other is at zero, the resultant being a practically continuous current.

The slight slow wavering of this current cannot be heard in a telephone, making such current practical for vacuum tube operation.

To enable different types of vacuum tubes to be used which may differ as to their electrical constants, I have shown an improved type of socket adapter, which allows any element of the tube to be used at will, so that it may be operated from a separate and independent source if desired. As an example, a special tube may be placed in a set using tubes of another type already supplied with generator current, and the special tube may be supplied with current from a dry battery or from a tap from a filter circuit.

My invention will best be understood by reference to the following description taken in connection with the accompanying drawings in which,—

Fig. 1 shows my complete system for supplying current to vacuum tubes from an alternating current supply.

Figs. 2 and 3 show in detail a special type of storage battery plate used in the miniature cells of the system.

Figs. 4 and 5 show in detail a special type of socket adapter, which enables a tube to be operated from a source independent of the alternating current supply if desired.

Figure 6:
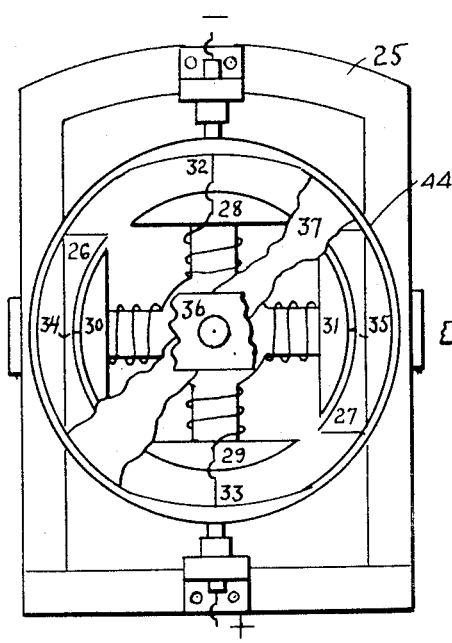
Figs. 6 and 7 show in detail my special type of generator or motor.

In Fig. 1, numeral 1 designates the source of alternating current supply which may be of the commercial 60 cycle 110 volt type. Numeral 2 is a transformer having both primary and secondary well insulated from each other, the secondary of which supplies current to the two rectifiers 3 and 4. These rectifiers may be one of a number of types or of different types, such as electrolytic, gaseous, rotary converter or any type giving constant operation.

For the electrolytic I have found the so-called "Colloid" rectifier having aluminum and lead elements satisfactory, also the tantalum and lead acid combination, and for the gaseous the so-called Tungar bulb.

If an electrolytic rectifier is used no condenser is necessary shunting it, as a condenser is inherent in the rectifier itself. I have found it advantageous in the case of an electrolytic rectifier to disconnect it from the batteries when not in use to prevent back leakage.

In case a Tungar rectifier is used its filament is heated in the customary manner and a condenser of approximately 2 mfds. connected in shunt to the hot and cold elements. This prevents shock excitation of the system by the action of the rectifier which would otherwise be detected by a radio receiver.

The battery of miniature storage cells 5 and 6 is charged in relays through the rectifiers 3 and 4 in the following manner:

Assuming a positive pulse from the transformer secondary to arrive at the intersection or middle tap of the battery as shown. It can flow only through the circuit including rectifier 3 and battery division 5, hence charges that division.

On the other hand when the current changes to negative it cannot flow through this last named circuit but can flow through rectifier 4 and battery division 6, charging that division.

Neither pulse can flow beyond impedance 8, and as both halves of the current do not flow at the same time through battery divisions 5 and 6, the voltage due to the drop across the battery terminals is less by half, hence the disturbance due to interfering pulses is diminished by half.

The counter E. M. F. of battery divisions 5 and 6 respectively, when using lead acid elements is approximately 2.25 volts, and there being two battery elements for each division the total counter E. M. F. across the terminals of the first battery is 9 volts.

The second set of miniature storage batteries, containing a smaller number of cells than the first, and shown as two cells numeral 7 is charged by the 9 volts counter E. M. F. from the first set of cells and in turn delivers a C. E. M. F. of 4.5 volts to the load.

This second set of cells by reason of the choking effect of the impedance 8 is not affected by the main charging source, which is pulsating, hence delivers a substantially smooth current to the load.

In practice I have found an impedance having a direct current resistance of 1 ohm and a resistance of 500 ohms at 60 cycles to be satisfactory in shielding the second set of cells from the rectified alternating current charging source where the output is 6 volts or less.

A second impedance 12 may be included in the leads of the load circuit as a further refinement and protection against local inductive effects if necessary.

The resistances 9 and 10 are pure resistances of the order of .2 ohms each and are continuously variable. The impedance 11 is also made continuously variable between 0 and .1 ohm. The purpose of these resistances is to introduce by way of a resistance coupled circuit, equal pulses from the rectifier circuit in opposition to any slight residual pulsation existing in the circuit 5, 6, 7, 8 and thereby neutralizing them.

It will be seen from the drawings that the connections to the end cells of both sets of batteries are made at separate and distinct points on the electrode. A detail of this is shown in Figs. 2 and 3.

The purpose of this special connection is to provide separate paths for the input and output circuits of each set of cells, thereby further reducing the effects of any drop that might occur due to the resistance of contacts and leads.

The vacuum tube 14 Fig. 1 is inserted in a special socket adapter shown in Fig. 4 and in this case one leg of the filament 13 is disconnected from its regular position in the circuit and an independent connection from the same element made at a higher voltage tap in the output set of batteries.

By this means the possibility of inserting a low voltage tube in the high voltage socket is prevented. When it is desired to use the low voltage tap the regular socket is used.

The telephone 15 is in circuit with the high voltage B battery generator 21.

Transformer 16 may be a standard inter-valve audio transformer in the plate circuit of another vacuum tube 17, which may be of different type than the tube 14, and includes in the plate circuit high voltage current from the generator 21.

The tube 17 may likewise be provided with one of my special socket adapters and I have shown another method of using it. In this case the grid return 18, is disconnected by the insulated cap from its regular position in the circuit and an independent connection made to the circuit of a voice transmitter, such as used in instruments for the deaf. This allows the use of a regular radio instrument in the home as an aid to hearing, and the transmitter 19 may be a very sensitive pick-up microphone, to respond to voices in the room, the regular telephone or special ear pieces being used for reception.

As illustrative of the many additional ways in which my improved socket may be used to advantage I may mention the following.

In neutrodyne sets, where it is desired to use an independent grid return for different types of tubes having different grid-filament capacity.

Where it is desired to test out various ratios of audio and radio frequency transformers in the same set.

Introducing tubes requiring different C batteries or grid bias.

Figure 7:
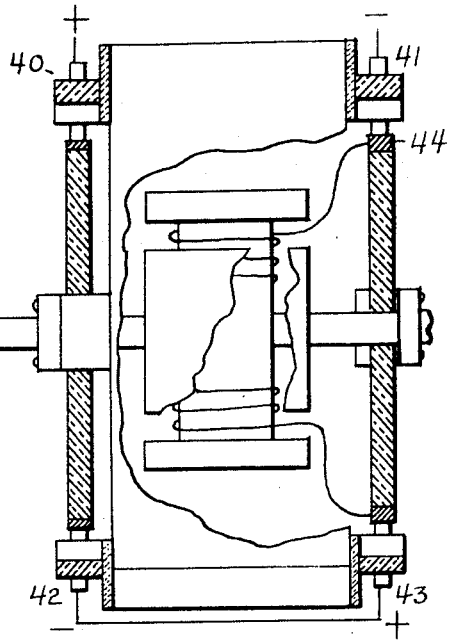
Figure 8:
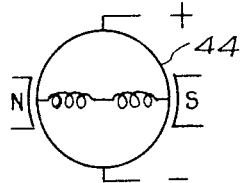
Fig. 8 shows the winding of one armature connected with my improved commutator, the armature being in the position of maximum resistance in the brush circuit.

The generators 21 and 22 are my improved generators without audible commutator ripple detailed in Figs. 6 and 7 and the motor 23 is of the same type, all being linked together by a common power transmission system.

The antennæ 20 may be of the loop or open circuit type.

I have found it desirable for purposes of economy to disconnect the input and output circuits of the system when not in use, and I perform both operations simultaneously by switches having a common control as shown.

The socket adapter detailed in Figs. 4 and 5 is preferably molded from a composition such as bakelite. Each prong of the adapter is permanently connected to an auxiliary binding post located at the top of the adapter to be easily accessible. Flexible leads may be substituted if desired.

Insulating caps of soft rubber or fiber are supplied with each adapter to be fitted over the prong of the element desired for independent connection as shown in Fig. 5.

The storage battery plate detailed in Fig. 2 is supplied with two separate lugs for independent connection to charging and discharging circuits connected to the same plate.

An alternative arrangement is shown in Fig. 3 in which the plate is divided, and an impedance connected between sections as a further refinement to decrease effects of voltage drop.

In Figs. 6 and 7 I have shown two views of my improved generator in which,—

Numeral 25 designates a permanent magnet of U form. It may also be an electromagnet and I do not limit myself to a single construction. The base is non-magnetic.

Numerals 26 and 27 are soft iron pole pieces of North and South polarity respectively.

Numerals 28 and 29 are the poles of one section of the laminated armature of the machine, the windings of which are connected to one commutator ring at points 32 and 33.

Numerals 30 and 31 are the poles of the other section of the armature of the machine, the windings of which are connected to another commutator ring at points 34 and 35.

Numeral 36 shows a cutaway section of the shaft support.

Numeral 37 shows a section of the supporting disc for commutator ring 44 in Fig. 7. It is preferably constructed of bakelite and is mounted on a collar which fits over the shaft of the machine as shown.

The commutator ring 44, Fig. 7 is fitted over the periphery of this disc and consists, in the case of a low voltage machine such as one for supplying filament current, of a thin unbroken ring of resistant material such as German silver.

For higher voltages such as required for supplying current to the plate circuit of vacuum tubes, rings of high resistance graphite may be used.

I have found the resistance of the ring as measured from diametrically opposite points should preferably be equal to that of the load which the generator is to supply.

The ring may be made of such cross-section shape that its resistance as measured between brushes pressing upon it varies in a manner to determine the wave shape of the current which the machine generates.

As an example, for a flat top wave, I may form a portion of the ring of unvarying thickness with a sudden change in cross-section at the point where it is desired the top of the wave shall terminate.

For a sine wave it is desirable to form the ring of equal cross-section throughout and form the pole tips to meet required conditions.

Two such supporting discs with rings on their periphery are fitted to the shaft, preferably at opposite ends, and the windings from their respective armatures are connected as shown.

Numerals 40 and 41 and 42 and 43 designate brush holders, with brushes preferably of carbon, each pair of which presses upon the smooth continuous surface of each commutator ring at opposite points of the ring.

Figure 9:
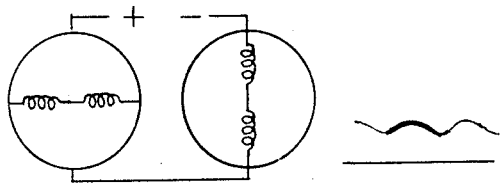
Figs. 9 and 10 show the two armatures of a generator connected in series and in parallel respectively.
Figure 10:
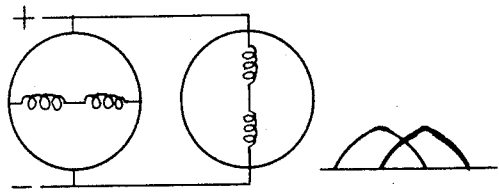
Figure 12:
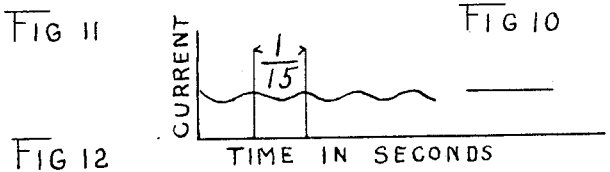
Fig. 12 shows the resultant of the components from the armature windings.

These brushes are connected together as in Figs. 9 and 10.

Figure 11:
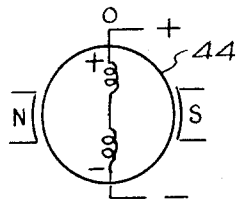
Fig. 11 is a view similar to Fig. 8 but showing the armature in the position of minimum resistance in the brush circuit.

Referring to Fig. 11 the operation of the generator is as follows:

The output circuit may briefly be described as consisting of two complete armature structures with commutator ring and brushes for each armature, the structures being connected in two phase formation, causing one to operate at maximum while the other is at zero, as shown in Figs. 9 and 10.

For simplicity I have shown in Fig. 11 a section of my improved commutator ring which may be considered as a linear conductor with the brush as a sliding contact as in a slide wire bridge, and the armature coil taps + and − as fixed points on the ring.

Starting with the contract at 0 and moving the ring with armature attached in counter clockwise rotation, it will be seen that as the armature progresses from a neutral position more resistance will be included between brush and armature coil tap plus and less between brush and armature coil tap minus, causing a rise in current.

When the brush is midway between these points the armature poles are opposite the field poles, and the rate of change is small, causing a fall in current.

When, however, the armature poles recede from the field poles the rate of change increases, and the resistance on the other side of the brush decreases, causing a rise in current, which continues until the armature poles progress approximately 90° when the current starts to fall, continuing until the armature poles are again at neutral, but in reverse position. The armature coil taps, however, have also reversed their position by the rotation of the ring, hence commutation is accomplished, but without any sudden changes in current.

To prevent the resultant current from falling to zero, the second armature which rotates with the first is connected in parallel or series, in two phase distribution, operating at maximum while the first is at minimum.

The very slight waver in the current may be smoothed out by an external impedance if desired.

I have found a speed of rotation of approximately 112 R. P. M. suitable for the machine as a generator. This gives a pulse frequency of approximately 7.5 per second per armature section, or 15 pulses per second total, which is too low to be audible in a telephone.

The motor is identical with the generator and may be operated on either alternating or direct current by suitably laminating the armatures and field poles and using a series winding on the field in the conventional manner.

When so constructed such a machine will operate without sparking at the brushes and may be used as a starting device for alternating current motors by using a transformer.

Both motor and generator are of relatively low efficiency due to the resistance of the commutator ring, but the heating from this is not excessive.

My improved motor generator and current changing means or filter may both be conveniently located within a phonograph cabinet and supplied with a flexible cord and plug attachment for a lamp socket with the object of furnishing a compact and reliable source of current supply for vacuum tubes which may be located in the cabinet.

While I have described the application of my invention to a particular system, it will be apparent to those skilled in the art that some of the elements may also be applied to other systems and that numerous applications thereof may be made without departing from the scope of the appended claims.

I claim:

1. A system for supplying current to vacuum tubes consisting of a source of alternating current, a plurality of rectifiers for said alternating current, each of said rectifiers supplying current to a storage battery at alternate intervals to thereby charge said battery, a second set of storage batteries having a lower counter electromotive force than that of said first battery, means for charging said second battery from the counter electromotive force of said first battery, means for shielding said second battery from the effects of said alternating current source, a load circuit adapted to be operated from the counter electromotive force of said second battery, and means for simultaneously interrupting the current supplying said rectifier and opening said load circuit.

2. In a system for supplying current to vacuum tubes including storage batteries, means to divide said batteries into sections, means to charge said storage battery sections at different time intervals, means to discharge said storage battery sections simultaneously into a second set of storage batteries having a lower counter electromotive force than the first, means to shield said second set of storage batteries from the initial charging source, a load circuit and means to connect said load circuit to different sections of said second storage battery, and means to interrupt said charging means and said load circuit simultaneously.

3. In a system for supplying current to vacuum tubes including storage batteries and a source of alternating current, rectifiers for said current, means to divide said batteries into sections, means to charge said storage battery sections at different time intervals, means to discharge said storage battery sections simultaneously to charge a second set of storage batteries having a lower counter electromotive force than that of said first battery, means to shield said second set of storage batteries from the main charging source, a load circuit, means to connect said load circuit to different sections of said second storage battery, means to simultaneously disconnect said load circuit from said second storage battery and said first battery from said charging source.

4. In a system for supplying current to vacuum tubes including storage batteries, means in an input circuit to charge said batteries, an output circuit for simultaneously discharging said batteries, a counter-feed-back circuit to neutralize undesired pulsations in the output circuit of said storage battery, having an element in said output circuit in opposition, to said pulsations and connected to the circuit of the battery.

5. In combination, a source of alternating current supply, a rectifier for converting said alternating current into direct current, an accumulator connected to said rectifier, a load circuit connected to said accumulator, and an additional energy path connected between said rectifier and said load circuit to neutralize out any alternating current ripples present in said load circuit due to the first mentioned alternating current supply.

6. In a vacuum tube circuit, a rectifier for a source of alternating current supply, a filtering circuit having accumulator and impedance elements for reducing fluctuations in current, an output circuit through a vacuum tube, a counter-feed-back circuit coupled with the source of alternating current supply and with the output circuit and means for interrupting the alternating current supply and said output circuit simultaneously.

7. In a vacuum tube circuit, a source of alteranting current supply, a rectifier therefore, a filtering circuit connected to said rectifier for smoothing out the fluctuations in current therethrough, and common switching means for interrupting the source of alternating current supply and the circuit of said filter.

8. In a vacuum tube circuit, a source of alternating current supply for feeding an output circuit through a rectifier, a filtering circuit connected with said rectifier and to a vacuum tube, resistances in said input circuit and adjustable taps associated therewith for completing connection to a counter-feed-back circuit in the output circuit of the filter whereby pulsations upon said output circuit will be neutralized by said counter-feed-back circuit.

9. In a vacuum tube circuit, a source of alternating current supply, a rectifier therefore, a filtering circuit connected in said rectifier for smoothing out the fluctuations in current therethrough, and common switching means for controlling the source of alternating current supply and the circuit of said filter.

10. In a vacuum tube circuit, a source of alternating current supply, a rectifier therefore, a filtering circuit connected to said rectifier for smoothing out the fluctuations of current therethrough, and common switching means for controlling simultaneously the source of alternating current supply and the circuit of said filter.

11. In a radio receiving apparatus utilizing a rectifier to convert the alternating current power supply into direct current to energize the receiving apparatus, means to reduce the production of alternating current hum in the receiver resulting from the alternating current pulsations caused by the power supply, said means comprising a feed-back circuit arranged to introduce alternating current pulsations from the rectifier circuit to the load circuit, said last mentioned pulsations being opposite in phase to the said alternating current hum.

12. In combination, a source of alternating current, a rectifier for converting said alternating current into direct current, a load circuit, a filter network connecting said rectifier to said load circuit, and means connected between said rectifier and said load circuit to neutralize out any alternating current ripples present in said load circuit due to the first mentioned alternating current supply.

13. In combination, a source of alternating current, a rectifier for converting said alternating current into pulsating current, an accumulator connected to said rectifier, a load circuit connected to said accumulator, and means including a transformer the primary winding of which is connected with the rectifier and the secondary of which is in said load circuit, to neutralize any alternating current ripples present in said load circuit due to the first mentioned alternating current supply.

EDWARD G. GAGE.